(12) United States Patent
Quitmeyer et al.

(10) Patent No.: US 7,273,067 B2
(45) Date of Patent: Sep. 25, 2007

(54) REDUCED PROFILE ELECTROMECHANICAL VALVE ACTUATOR

(75) Inventors: James N. Quitmeyer, Chandler, AZ (US); Kellan P. Geck, Chandler, AZ (US); Louie T. Gaines, Phoenix, AZ (US); Jeff S. Rayner, Gilbert, AZ (US); Charles M. Royalty, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 237 days.

(21) Appl. No.: 11/107,568

(22) Filed: Apr. 14, 2005

(65) Prior Publication Data

US 2006/0231784 A1   Oct. 19, 2006

(51) Int. Cl.
*F16K 37/00* (2006.01)
(52) U.S. Cl. .................. 137/553; 137/559; 251/129.11
(58) Field of Classification Search ............................... 251/129.11–129.13, 294; 137/553, 559, 137/556, 556.3
See application file for complete search history.

(56) References Cited

U.S. PATENT DOCUMENTS

| | | | |
|---|---|---|---|
| 3,584,276 A * | 6/1971 | Ringland et al. ........... 318/721 |
| 4,133,511 A | 1/1979 | Hartmann et al. |
| 4,287,432 A | 9/1981 | Sensibar |
| 4,305,029 A | 12/1981 | Takahashi |
| 4,575,666 A | 3/1986 | Nakashima et al. |
| 4,690,168 A | 9/1987 | Kihm |
| 4,807,662 A * | 2/1989 | Verne .................... 251/129.12 |
| 4,809,742 A | 3/1989 | Grau |
| 5,025,686 A * | 6/1991 | Sato et al. .................... 477/44 |
| 5,059,879 A | 10/1991 | Watanabe |
| 5,518,028 A | 5/1996 | Walker |
| 5,680,878 A | 10/1997 | Chouinard, Jr. |
| 5,921,277 A * | 7/1999 | Bernal ......................... 251/305 |
| 5,937,835 A * | 8/1999 | Turner et al. .......... 251/129.13 |
| 5,988,353 A * | 11/1999 | Asai et al. ................ 198/468.4 |
| 5,998,892 A | 12/1999 | Smith et al. |
| 6,082,377 A * | 7/2000 | Frey .............................. 134/6 |
| 6,138,712 A * | 10/2000 | Hirose ..................... 251/335.2 |
| 6,244,296 B1 | 6/2001 | Lafler et al. |
| 6,321,780 B1 * | 11/2001 | Iwabuchi .................... 251/356 |
| 6,367,768 B1 * | 4/2002 | Brocard et al. ......... 251/129.12 |
| 6,581,567 B2 * | 6/2003 | Deguchi ...................... 123/336 |
| 6,647,960 B2 * | 11/2003 | Rauch et al. .......... 251/129.12 |
| 6,886,529 B2 * | 5/2005 | Suzuki et al. ................ 123/342 |
| 2003/0136930 A1 | 7/2003 | Dowden et al. |

* cited by examiner

*Primary Examiner*—John Bastianelli
(74) *Attorney, Agent, or Firm*—Ingrassia Fisher & Lorenz

(57) ABSTRACT

A relatively small, lightweight valve actuator assembly that can withstand relatively high levels of vibration and shock includes a motor, a position sensor, and a drive belt mounted on an actuator housing assembly. The position sensor is preferably disposed within a sensor housing that is mounted on a side of the actuator housing assembly. As a result, the overall center-of-gravity (CG) and weight of the actuator assembly is significantly reduced, as is the overall size envelope.

17 Claims, 2 Drawing Sheets

REDUCED PROFILE ELECTROMECHANICAL VALVE ACTUATOR

TECHNICAL FIELD

The present invention relates to actuators and, more particularly, to a an actuator that is compact, lightweight, and configured to resist significant amounts of environmental vibration and impact shock.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In some applications such as, for example, various submarine and other shipboard system valves, the actuators that are used to effect valve movement are designed to withstand relatively high magnitude shock and vibration. The actuators used in these latter applications, most notably submarine applications, are also preferably configured to operate at relatively low noise levels.

Presently, most valve actuators that have been designed and implemented to achieve the robust design goals noted above are hydraulic-type actuators. Although relatively lightweight electromechanical actuators that can withstand relatively high magnitude shock and vibration are presently available, these actuators may not be sufficiently compact and/or lightweight. Similarly, while relatively compact, lightweight electromechanical actuators may be presently available, these actuators may not be able to sufficiently withstand the relatively severe environmental conditions, and/or the relatively high shock and vibration demands.

Hence, there is a need for an electromechanical valve actuator that is compact, lightweight, and can withstand the relatively high magnitude shock and vibration levels. The present invention addresses at least this need.

BRIEF SUMMARY

The present invention provides a relatively small, lightweight actuator assembly that can withstand relatively high levels of vibration and shock. In one embodiment, and by way of example only, a valve actuator assembly includes an actuator housing assembly, a motor, a position sensor, and a drive belt. The motor is mounted in the actuator housing assembly, is adapted to receive valve position command signals, and is configured, upon receipt thereof, to supply a drive force. The position sensor is rotationally mounted in the actuator housing assembly and is operable to supply a position signal that is at least representative of a rotational position of the motor. The drive belt is coupled between the motor and the position sensor and is configured to couple the drive force to the position sensor.

In another exemplary embodiment, a valve actuator assembly includes an actuator housing assembly, a motor, an actuator output shaft, a position sensor, and a drive belt. The motor is mounted in the actuator housing assembly, is adapted to receive valve position command signals, and is configured, upon receipt thereof, to supply a drive force. The actuator output shaft is rotationally mounted in the actuator housing assembly, is coupled to receive the rotational drive force from the motor, and is configured, upon receipt thereof, to rotate to a rotational position. The position sensor is rotationally mounted in the actuator housing assembly and is operable to supply a position signal that is at least representative of the rotational position of the actuator output shaft. The drive belt is coupled between the actuator output shaft and the position sensor and is configured to couple the drive force to the position sensor.

In yet a further exemplary embodiment, a valve actuator assembly includes an actuator housing assembly, a motor, an actuator output shaft, a position sensor, and a drive train. The actuator housing assembly has a motor end, an output end, and one or more sidewalls therebetween. The motor is mounted in the actuator housing assembly proximate the motor end. The motor is adapted to receive valve position command signals and is configured, upon receipt thereof, to supply a drive force. The actuator output shaft is rotationally mounted in the actuator housing assembly and extends at least partially from the output end. The actuator output shaft is coupled to receive the rotational drive force from the motor and is configured, upon receipt thereof, to rotate to a rotational position. The position sensor is rotationally mounted in the actuator housing assembly proximate one of the sidewalls thereof. The position sensor is operable to supply a position signal that is at least representative of the rotational position of the actuator output shaft. The drive train is coupled between the motor and the position sensor and is configured to couple the drive force to the position sensor.

Other independent features and advantages of the preferred actuator assembly will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. In this regard, before proceeding with the detailed description, it is to be appreciated that the described embodiment is not limited to use in conjunction with a specific vehicle or system. Thus, although the description is explicitly directed toward an embodiment that is implemented in a submarine valve actuation control system, it should be appreciated that it can be implemented in other vehicles and other actuation system designs, including those known now or hereafter in the art.

Figure 1:
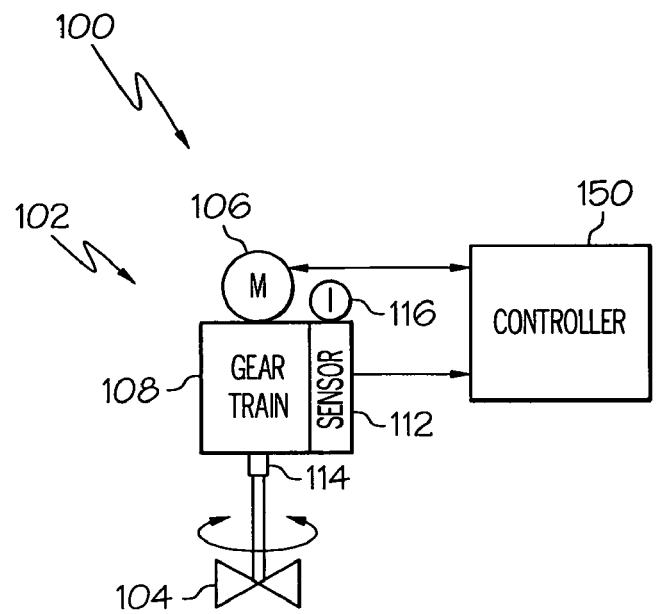
FIG. 1 is a functional block diagram of an exemplary valve actuation control system according to an embodiment of the present invention.

Turning now to the description and with reference first to FIG. 1, a functional block diagram of an exemplary valve actuation control system 100 is shown. The system 100, which may be used to control the movement of one or more valves, includes an actuator assembly 102 and a controller 150. The actuator assembly 102, which is preferably configured to position a valve 104, includes a motor 106, a gear train 108, a position sensor 112, and an actuator output shaft 114. The motor 106 is coupled to the gear train 108, and is preferably implemented as an electric motor. It will be appreciated that the motor 106 may be any one of numerous types of AC or DC motors now known or developed in the future including, for example, an AC induction motor or a brushed DC motor. In a preferred embodiment, however, the motor 106 is implemented as a brushless DC motor. Although the motor 106 is preferably implemented as an electric motor, it will nonetheless be appreciated that the motor 106 could be implemented, if so desired, as a pneumatic or hydraulic motor.

No matter how the motor 106 is specifically implemented, it is configured, upon being properly energized and supplied with actuation position control signals, to rotate and thereby supply a rotational drive force to the gear train 108. The gear train 108 is coupled to an output shaft 116 and, in response to the rotational drive force supplied from the motor 106, transfers the rotational drive force to the actuator output shaft 114 at a reduced rotational speed, to thereby move the valve 104 to a desired position.

The position sensor 112 is configured to rotate and is additionally coupled to receive a rotational drive force from the actuator output shaft 114. Thus, when the actuator output shaft 114 rotates, the position sensor 112 also rotates. The position sensor 112 is configured to supply a position signal representative of the rotational position of the actuator output shaft 114, and thus the position of the valve 104. As FIG. 1 additionally depicts, the position signal is preferably supplied to the controller 150. In addition, one or more visual indicators (I) 116 are included to provide redundant, local visual position indications of the actuator output shaft 114 and the valve 104.

The controller 150 supplies the actuation position control signals to the motor 106 and, as was just mentioned, receives valve position signals from the position sensor 112. The controller 150 is configured to receive external control signals from one or more external sources (not shown in FIG. 1). In response to these control signals, the controller 150 supplies the actuation position control signals to the motor 106, which appropriately energizes the motor 106 to rotate in the direction that will cause the valve 104 to move to a desired position. The controller 150, using the valve position signals as feedback, implements a closed-loop control scheme to move the valve 104 to the desired position. It will be appreciated that the controller 150 may be configured to implement any one of numerous control schemes.

Figure 3:
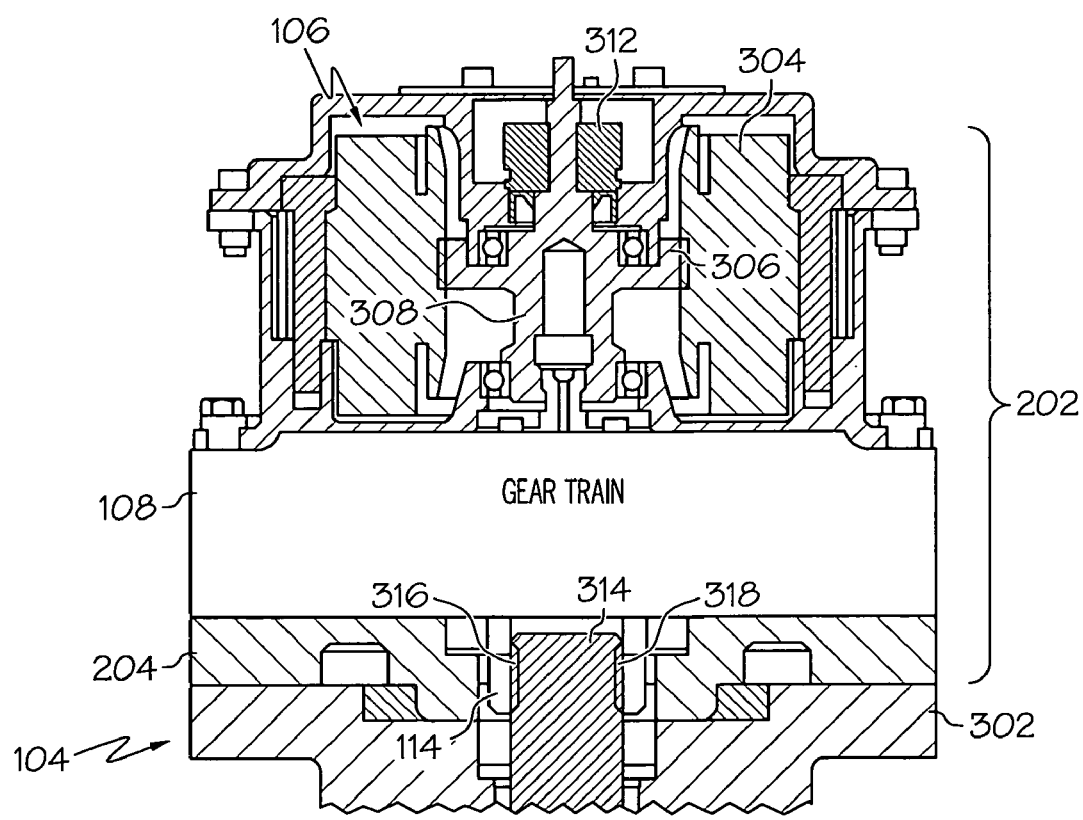
FIG. 3 is a partial cross section view of the valve actuator assembly shown in FIG. 2 coupled to a valve.
Figure 2:
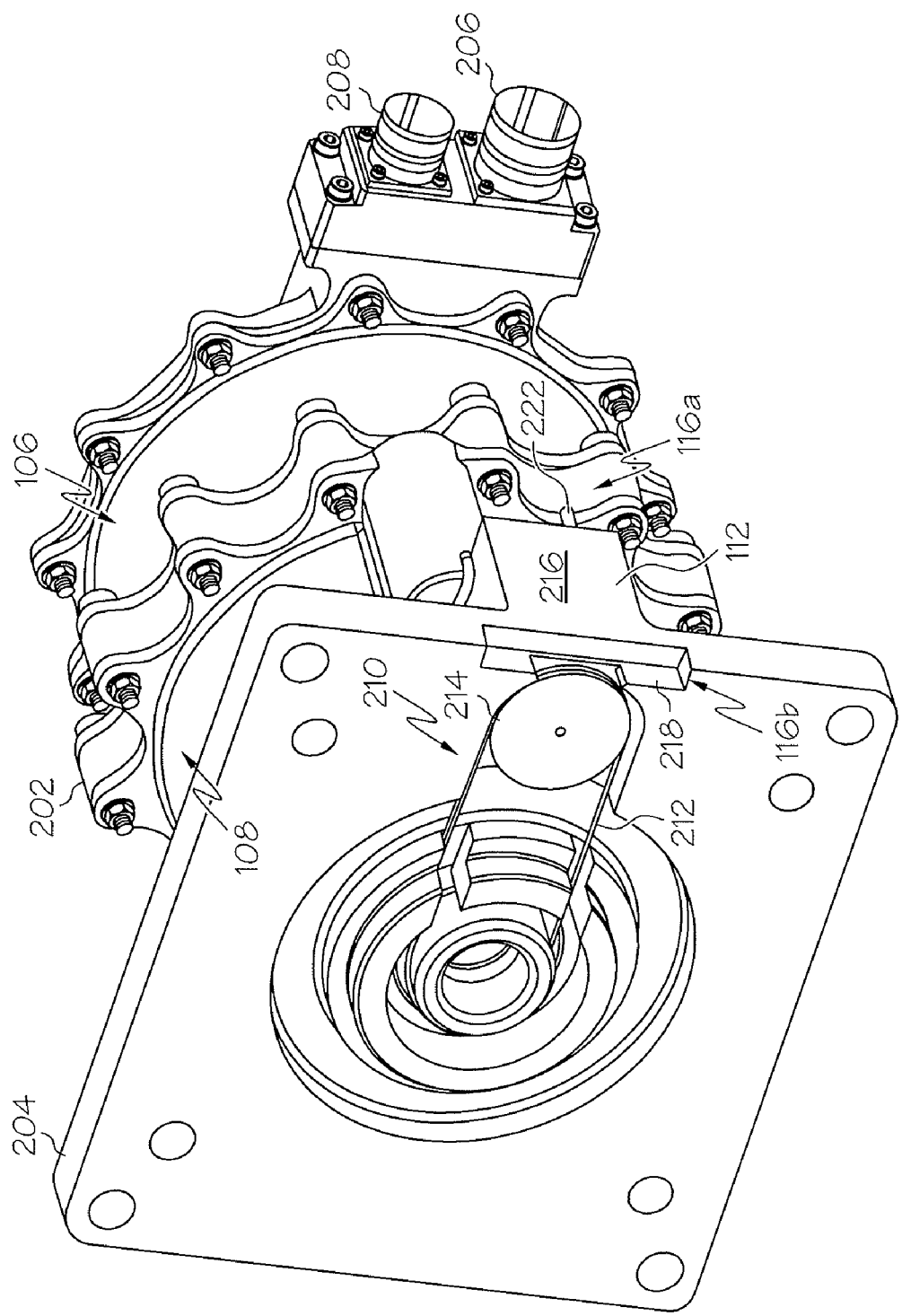
FIG. 2 is perspective views of an exemplary physical implementation of a valve actuator assembly that may be used to implement the system of FIG. 1.

Turning to FIGS. 2 and 3, an embodiment of a particular preferred physical implementation of the actuator assembly 102 described above is shown, and will now be described in more detail. The actuator assembly 102 shown in FIGS. 2 and 3 includes physical implementations of the various actuator components described above, which for convenience are labeled using like reference numerals as in FIG. 1. As is shown most clearly in FIG. 3, which is a cross section view of the actuator assembly 102 shown in FIG. 2, the depicted actuator assembly 102 is implemented with the motor 106, the gear train 108, and the position sensor 112 all disposed within or supported on a single actuator housing assembly 202.

The actuator housing assembly 202 completely encloses or supports each of the above-mentioned components, and includes a mounting flange 204 that is used to mount the actuator housing assembly 202 to a body 302 (see FIG. 3) of the valve 104. The actuator housing assembly 202 additionally has two electrical connectors 206, 208 coupled thereto that extend away from the housing assembly 202. These electrical connectors include a motor connector 206 and a sensor connector 208 that are adapted to receive one or more non-illustrated cables. The motor connector 206 is used to electrically interconnect the controller 150 and the motor 106, and the sensor connector 208 is used to electrically interconnect the controller 150 and the position sensor 112. Alternatively, one or more wire harnesses or pigtails, for example, could be used instead of the connectors 206, 208.

Turning now to a description of the components mounted within or on the actuator housing assembly 202, it will be appreciated that the motor 106 functions, and is configured, as described above. Thus, it is preferably a brushless DC motor, which includes a stator 304, a rotor 306, a motor output shaft 308, and a motor resolver 312. The motor 106 receives valve position command signals from the controller 150, via the motor connector 206, to appropriately energize the stator 304 and rotor 306. In response to the valve position command signals, the motor 106, and more specifically the rotor 306 and motor output shaft 308, rotates in the commanded direction to supply a rotational drive force to the gear train 108. The motor resolver 312 is mounted on the motor output shaft 308 and rotates therewith. The motor resolver 312, as is generally known, supplies position signals representative of the rotational position of the rotor 306 to the controller 150 so that the motor 106 is properly commutated.

The gear train 108 is coupled between the motor output shaft 308 and the actuator output shaft 114, and is configured with a step-down gear ratio so that a desired speed reduction of the motor 106 rotational speed occurs. The rotational drive force supplied from the motor 106 is transferred, at the reduced rotational speed, to the actuator output shaft 114. The actuator output shaft 114, which is rotationally mounted within the actuator housing assembly 202, in turn rotates and, when coupled to the stem 314 of the valve 104, moves the valve 104 to the position commanded by the controller 150. The actuator output shaft 114 may be coupled to the valve stem 314 in any one of numerous ways. For example, the actuator output shaft 114 and valve stem 314 could be pinned together, coupled with one or more fasteners, or threaded to one another. In the depicted embodiment, however, the actuator output shaft 114 and valve stem 314 are coupled together via a spline connection, in which a plurality of splines 316 are formed on an inner circumferential surface of the actuator output shaft 114 and a plurality of mating splines 318 are formed on an outer circumferential surface of the valve stem 314.

Before proceeding further, it will be appreciated that the gear train 108 may be implemented using any one of numerous gear arrangements, now known or developed in the future, that may be configured with a step-down gear ratio. Moreover, it is noted that the specific structure of the gear train 108 is not needed to understand or enable the claimed invention, nor is there a specific gear train structure that is considered to implement a best mode of the claimed invention. Indeed, in various embodiments, the gear train 108 could be eliminated altogether. As such, the gear train 108 is depicted in FIG. 3 using a functional block. It will additionally be appreciated that the rotational speed reduction provided by the gear train 108 may vary to achieve a desired torque-speed characteristic for the actuator assembly 102.

The position sensor 112 is rotationally mounted within the actuator housing assembly 202 and is additionally coupled to receive the rotational drive force supplied from the motor 106, via the actuator output shaft 114. More specifically, in the depicted embodiment the position sensor 112 is implemented as a resolver that is coupled to the actuator output shaft 114 via a drive train 210. In the depicted embodiment, the drive train 210 is implemented using a drive belt 212 and a pulley 214. However, it will be appreciated that the drive train 210 could be implemented in other manners such as, for example, a chain and sprocket configuration, or a set or interlocking gears. No matter its specific implementation, when the output shaft 114 rotates and supplies a rotational drive force to the valve 104, the drive train 210 transfers the rotational drive force to the resolver 112, which causes the resolver 112 to rotate.

The resolver 112 is energized from, and supplies valve position signals to, the controller 150 via the sensor connector 208. It will be appreciated that a resolver 112 is merely exemplary of any one of numerous other types of sensors that may be used to implement the position sensor 112. For example, the position sensor 112 could instead be implemented using a rotary variable differential transformer (RVDT), a rotational magnetic type sensor, or an optical sensor, just to name a few.

As FIG. 2 also shows, the position sensor 112 is preferably disposed within a sensor housing 216 that is mounted on a side of the actuator housing assembly 202. By mounting the sensor housing 216, and thus the position sensor 112 on the side of the actuator housing assembly 202, rather than integrally with the output shaft, the overall center-of-gravity (CG) and weight of the actuator assembly 102 is significantly reduced, as is the overall size envelope.

In addition to the valve position signals supplied to the controller 150, the valve position can also be ascertained via two separate visual indicators 116a, 116b. In the depicted embodiment, one of the visual indicators 116a is implemented via a viewing port 218 is formed, or otherwise provided, in the mounting flange 204, which allows the drive belt 212 to be viewed. Preferably, with this implementation, the drive belt 212 is marked with indicia of valve 104 and/or output shaft 114 positions. The other visual indicator 116b is implemented via shaft 222 that extends from the sensor housing 216, and is also preferably marked with indicia of valve 104 and/or output shaft 114 positions. It will be appreciated that although two visual indicators 116a, 116b are shown more or less than this number may be used. It will additionally be appreciated that the visual indicators 116a, 116b described herein are merely exemplary, and may be implemented in any one of numerous configurations.

The above-described actuator assembly 102 is compact and lightweight. The actuator assembly 102 additionally has a relatively low CG, and as such can withstand relatively high shock and vibration loads.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A valve actuator assembly, comprising:
an actuator housing assembly;
a motor mounted in the actuator housing assembly, the motor adapted to receive valve position command signals and configured, upon receipt thereof, to supply a drive force;
a position sensor rotationally mounted in the actuator housing assembly and operable to supply a position signal that is at least representative of a rotational position of the motor;
a drive belt coupled between the motor and the position sensor and configured to couple the drive force to the position sensor, the drive belt including indicia thereon that is representative of the rotational position of the motor; and
a viewing port disposed on the actuator housing assembly and positioned to provide visual inspection of at least a portion of the indicia on the drive.

2. The valve actuator assembly of claim 1, further comprising:
an actuator output shaft rotationally mounted within the actuator housing assembly, the actuator output shaft coupled to receive the rotational drive force from the motor and configured, upon receipt thereof, to rotate to a rotational position.

3. The valve actuator assembly of claim 2, further comprising:
a gear train coupled between the motor and the actuator output shaft, the gear train configured to receive the rotational drive force supplied by the motor and transfer the rotational drive force to the actuator output shaft.

4. The valve actuator assembly of claim 3, wherein the gear train is configured as a step-down gear train.

5. The valve actuator assembly of claim 2, wherein:
the drive belt is coupled between the actuator output shaft and the position sensor; and
the position signal is at least representative of the rotational position of the actuator output shaft.

6. The valve actuator assembly of claim 2, wherein the drive train comprises:
a pulley rotationally mounted on the actuator assembly housing and coupled between the position sensor and the drive belt, whereby the position sensor rotates in response to actuator output shaft rotation.

7. The valve actuator assembly of claim 1, wherein the motor comprises a brushless DC motor.

8. The valve actuator assembly of claim 1, wherein the position sensor comprises a resolver.

9. The valve actuator assembly of claim 1, further comprising:
an indicator coupled to the position sensor and extending at least partially from the actuator housing assembly, the indicator including indicia thereon that is representative of the rotational position of the motor.

10. A valve actuator assembly, comprising:
an actuator housing assembly;
a motor mounted in the actuator housing assembly, the motor adapted to receive valve position command signals and configured, upon receipt thereof, to supply a drive force;
an actuator output shaft rotationally mounted in the actuator housing assembly, the actuator output shaft coupled to receive the rotational drive force from the motor and configured, upon receipt thereof, to rotate to a rotational position;

a position sensor rotationally mounted in the actuator housing assembly and operable to supply a position signal that is at least representative of the rotational position of the actuator output shaft;

a drive belt coupled between the actuator output shaft and the position sensor and configured to couple the drive force to the position sensor, the drive belt including indicia thereon that is representative of the rotational position of the actuator output shaft; and a viewing port disposed on the actuator housing assembly and positioned to provide visual inspection of at least a portion of the indicia on the drive.

11. The valve actuator assembly of claim 10, further comprising:

a step-down gear train coupled between the motor and the actuator output shaft, the gear train configured to receive the rotational drive force supplied by the motor and transfer the rotational drive force to the actuator output shaft.

12. The valve actuator assembly of claim 10, further comprising:

a pulley rotationally mounted on the actuator assembly housing and coupled between the position sensor and the drive belt, whereby the position sensor rotates in response to actuator output shaft rotation.

13. The valve actuator assembly of claim 10, wherein the motor comprises a brushless DC motor.

14. The valve actuator assembly of claim 10, wherein the position sensor comprises a resolver.

15. The valve actuator assembly of claim 10, further comprising:

an indicator coupled to the position sensor and extending at least partially from the actuator housing assembly, the indicator including indicia thereon that is representative of the rotational position of the motor.

16. A valve actuator assembly, comprising:

an actuator housing assembly having a motor end, an output end, and one or more sidewalls therebetween;

a motor mounted in the actuator housing assembly proximate the motor end, the motor adapted to receive valve position command signals and configured, upon receipt thereof, to supply a drive force;

an actuator output shaft rotationally mounted in the actuator housing assembly and extending at least partially from the output end, the actuator output shaft coupled to receive the rotational drive force from the motor and configured, upon receipt thereof, to rotate to a rotational position;

a position sensor rotationally mounted in the actuator housing assembly proximate one of the sidewalls thereof, the position sensor operable to supply a position signal that is at least representative of the rotational position of the actuator output shaft;

a pulley rotationally mounted on the actuator assembly housing and coupled to the position sensor;

a drive belt coupled between the actuator output shaft and the pulley, the drive belt configured to translate rotation of the actuator output shaft into rotation of the pulley and including indicia thereon that is representative of the rotational position of the actuator output shaft; and a viewing port disposed on the actuator housing assembly and positioned to provide visual inspection of at least a portion of the indicia on the drive.

17. The valve actuator assembly of claim 16 further comprising:

a step-down gear train coupled between the motor and the actuator output shaft, the gear train configured to receive the rotational drive force supplied by the motor and transfer the rotational drive force to the actuator output shaft.

* * * * *